United States Patent [19]
Kogure et al.

[11] 3,951,667
[45] Apr. 20, 1976

[54] INORGANIC ANTICORROSIVE COATING MATERIAL

[75] Inventors: Hideo Kogure; Hiroshi Kuriyama; Fumihiko Nakakita, all of Hiratsuka, Japan

[73] Assignee: Kansai Paint Company, Ltd., Amagasaki, Japan

[22] Filed: Nov. 14, 1974

[21] Appl. No.: 523,704

Related U.S. Application Data
[63] Continuation of Ser. No. 326,139, Jan. 23, 1973, abandoned.

[30] Foreign Application Priority Data
Jan. 26, 1972 Japan.................................. 47-9032
Feb. 4, 1972 Japan................................ 47-12187

[52] U.S. Cl..................................... 106/1; 106/14; 106/74; 106/84; 106/287 S
[51] Int. Cl.²........................................... C09D 5/10
[58] Field of Search .................. 106/1, 14, 287, 74, 106/84; 117/135.1

[56] References Cited
UNITED STATES PATENTS

| | | | |
|---|---|---|---|
| 2,919,996 | 1/1960 | Teja...................................... | 106/74 |
| 2,978,361 | 4/1961 | Seidl..................................... | 106/74 |
| 3,180,746 | 4/1965 | Patton................................... | 106/14 |
| 3,214,302 | 10/1965 | Brodt et al............................. | 106/74 |
| 3,666,531 | 5/1972 | Cocks............................... | 106/38.22 |

*Primary Examiner*—Lorenzo B. Hayes
*Attorney, Agent, or Firm*—Wigman & Cohen

[57] ABSTRACT

Inorganic anticorrosive coating material which forms excellent coating film having several good properties of hardness, water resistance, anticorrosiveness, drying property and so forth. The coating material is prepared by the steps of: mixing an aqueous solution of water soluble silicate and one member or a mixture of vanadium and vanadium compounds; causing thus obtained mixture to react at the room temperature or by heating to form an aqueous solution of modified water soluble silicate; and dispersing anticorrosive metallic powder into said aqueous solution of modified water soluble silicate.

10 Claims, No Drawings

INORGANIC ANTICORROSIVE COATING MATERIAL

This is a continuation of application Ser. No. 326,139, filed Jan. 23, 1973, and now abandoned.

This invention relates to inorganic anticorrosive coating material. More particularly, the invention relates to the coating material which contains anticorrosive metallic powder as the principal pigment component and an aqueous solution of modified water soluble silicate as the vehicle component.

As known water soluble silicates, there are sodium silicate and potassium silicate, and inorganic coating materials are conventionally prepared by mixing the aqueous solution of the silicates with several kinds of metallic powders. The coating film which is formed by a mixture of, for example, metallic zinc powder and the silicate is inferior in the water resistance because water soluble alkali metal is contained in the coating film and the coating is liable to gather white rust. And when the coating film comes in contact with water, the film is softened and dissolved gradually although there is no change of appearance. Further, such conventional coating film is not good in the adhesion to the top coating film as applied thereon, so that the blistering and peeling of the top coating film are liable to occur. Furthermore, in a highly humid condition, solid coating film can not be formed from the conventional alkali silicate coating material, and softening and peeling of the formed coating film are also caused. In order to eliminate these defects, lithium silicate which has a lower water solubility is used recently, however, it is difficult to eliminate the above-mentioned defects completely, in addition to that the cost for the coating material becomes expensive.

In order to eliminate such defects, there is proposed a method in which after-treatment such as heat treatment or acid treatment is applied after the coating of the material, however, the former treatment can not be applied to large structures and the latter treatment is troublesome in its operation, therefore such methods are disadvantageous.

The principal object of the present invention is to eliminate the above-mentioned defects and disadvantages.

Further object of the invention is to provide an improved anticorrosive coating material which is free from the above-mentioned disadvangages.

Still further object of the invention is to provide an improved anticorrosive coating composition which has excellent water resistance, anticorrosiveness, adhesion and other good properties.

That is, the inorganic anticorrosive coating material of the present invention is prepared through the steps of mixing an aqueous solution of water soluble silicate and one member or a mixture of vanadium and vanadium compounds; causing thus obtained mixture to react at the room temperature or by heating to form an aqueous solution of modified water soluble silicate; and dispersing anticorrosive metallic powder, and if necessary, other pigments into said aqueous solution of modified water soluble silicate.

The above-mentioned coating material provides a superior coating film which has excellent water resistance, long term anticorrosiveness and good adhesion to the top coating. Further, the heat or acid treatment after the coating step is not necessary, therefore the coating process can be simplified and rationalized very much. Such effects have never been expected in the conventional coating materials of this kind. In addition to that, the coating film which is obtained from the coating material of the invention is excellent in other properties such as hardness, anticorrosiveness, high build in one coating, drying property, heat resistance and solvent resistance.

In the present invention, the aqueous solution of modified water soluble silicate can be prepared through such step that the aqueous solution of water soluble silicate is caused to react with one member or a mixture of vanadium and metallic compounds thereof with or without heating and with agitation. For example the two ingredients are caused to react at 4 days or more at the room temperature, i.e. 20° to 30°C, 24 hours or more at about 60° to 70°C, or 8 hours or more at about 100°C. As will be seen from the Tables which follow the reaction conditions from about 60°C at 24 hours or more to about 100°C at 8 hours or more is prefered. It is not always necessary completely to dissolve vanadium and vanadium compounds or a mixture of vanadium and the metallic compounds with zinc, aluminium and their metallic compounds into the water soluble silicate. However, it is indespensable that more than 0.5 parts, preferably 1.0 part by weight against 100 parts by weight (as solid) of the water soluble silicate is dissolved into the water soluble silicate.

In the above step to prepare the aqueous solution of modified water soluble silicate as the vehicle, 100 parts by weight (as solid) of the water soluble silicate is admixed with 0.5 to 25 parts by weight, preferably 1.0 to 20 parts by weight of one member or a mixture of vanadium and vanadium compounds If less than 0.5 parts by weight of the latter component is used, sufficient modification of the water soluble silicate can not be carried out, and the top coating is inferior in the water resistance and adhesion. On the other hand, if more than 25 parts by weight of the metallic material is used, gelation is caused during the agitation of the reaction and the directing reaction product can not be obtained.

Further vanadium and vanadium compounds can also be admixed with zinc, aluminium and their metallic compounds. In this case, vanadium and metallic compounds thereof are more than 1.0 part by weight against 100 parts by weight of the water soluble silicate and the total amount of the mixture of vanadium and vanadium compounds with zinc, aluminium and their metallic compounds is less than 25 parts against 100 parts by weight of the water soluble silicate.

The water soluble silicate as used in the present invention is represented by the following general formula:

$$M_2O \cdot xSiO_2$$

in which M is an alkali metal, $-N(CH_2OH)_4$, $-N(C_2H_4OH)_4$ or $-N(CH_3)_3C_6H_5$, and $x$ is a positive number from 2 to 9.0. As the alkali metal salts, lithium silicate, sodium silicate, potassium silicate, rubidium silicate and cesium silicate are exemplified. Further, the compounds of the above formula which are added with crystal water may also be used.

The metallic compounds of vanadium which are used in the present invention may be oxides, hydroxides, halides, sulfates, phosphates, silicates, borates, nitrates, carbonates, organic acid salts and their complexes or double salts. In the present invention one member or a mixture of two or more of vanadium, vanadium compounds and their baked products can be used.

The metallic compounds which are used by combination with vanadium and vanadium compounds in the present invention may be oxides, hydroxides, halides, sulfates, phosphates, silicates, nitrates, carbonates, organic acid salts and their complexes or double salts of aluminium or zinc.

As the anticorrosive metallic powder, zinc powder which has an average particle size of 3 to 5 microns and particle size distribution of 1 to 15 microns is most suitable. Further, aluminium powder, lead powder or mixture of the above powders can be used. Still further, the coating material of the present invention can be mixed with color pigment, extender pigment and anticorrisive pigment for the purposes of coloring, prevention of precipitation or regulation of the activity of the metallic powder. As the color pigments, there are, for example, titanium oxide, zinc oxide, iron oxide, carbon black and Phthalocyanine Blue, and as the extender pigments, there are, for example, magnesium silicate, aluminium silicate, silicic acid anhydride and barium sulfate. Further as the anticorrosive pigments, red lead, basic zinc chromate and lead cyanamide may be exemplified.

The ratio between the vehicle and the pigments may be defined such that the content of the pigments in the dried coating film is in the range of 80 to 97 percent by weight, and preferably in the range of 85 to 95 percent by weight.

As disclosed in the above, the coating film which is obtained from the coating material of the present invention is excellent in the water resistance, the reason for which is considered as follows. That is, the above-mentioned modified water soluble silicate forms complicated complex salt and it provides the water insoluble coating film. Further, the vanadium and vanadium compounds react directly with the water soluble silicate, and a part of the M in the foregoing general formula of silicate is substituted by metals to form stable silicate, thereby the water resistance of the coating film can be very much improved.

The water resistance of the coating film which is obtained from the coating material of the present invention prevents the anticorrosive pigment from dissolving off, thus the anticorrosiveness of the coating film can be kept for a long period of time, and further the modified silicate is chemically stable, therefore when the coating film is further applied with organic finish coating, excellent adhesion between two coating films can be obtained without forming any blister or peeling. When sodium silicate is used as the vehicle component, the above property is better as compared with the case in which lithium silicate being used. Therefore, the coating material of the present invention is advantageous also in view of the production cost.

The coating material which is added with the anticorrosive pigment into the vehicle can be used for a long time and a thick film can be formed without causing cracks of the film. And the obtained coating film has excellent properties such as hardness, drying property, anticorrosiveness, solvent resistance and heat resistance. Further, such excellent properties can be obtained without any treatment after the coating step and the finish coating can be applied thereon, therefore the coating process can be simplified and rationalized. As explained in the above, the coating material of the present invention can be used for heavy duty anticorrosive coating as the high build-type coating material as well as it can be used also as ordinary anticorrosive coating material for general purposes. Still further, by making use of the excellent characteristics of the vehicle of the present invention, a superior finish coating material can be prepared by employing ordinary pigments.

In order that those skilled in the art may better understand the present invention and the manner in which it may be practised, the following specific examples are given, in which unless otherwise indicated, parts and percents are expressed by weight.

PREPARATION EXAMPLE 1

Into a sealed reaction vessel, 100 parts of 40% aqueous solution of sodium silicate ($Na_2O \cdot 3SiO_2$), 2 parts of vanadium hydroxide and 2 parts of aluminium fluoride were fed, and the mixture was caused to react at 60°C for 24 hours with agitation, thereby an aqueous solution of modified water soluble silicate was obtained.

PREPARATION EXAMPLE 2–22

In like manner as the procedure in the foregoing Preparation Example 1, the materials as indicated in the following Tables 1 (a) and 1 (b) were caused to react under the indicated conditions to obtain the aqueous solutions of modified water soluble silicates.

EXAMPLE 1

A coating material of this invention was prepared by mixing 460 parts of metallic zinc powder (average particle size: 5 microns) into 100 parts of the aqueous solution of modified water soluble silicate which was obtained in Preparation Example 1, and the mixture was stirred well by using a high speed stirrer. Then, thus obtained coating material was applied on sandblasted steel plates by using an air-spray gun. Thereafter, several properties of the formed coating film were tested, the results of which are shown in the following Tables 3 (a) and 3 (b).

EXAMPLES 2–22

Several coating materials were prepared in like manner as the procedure in the foregoing Example 1 by using the aqueous solutions of modified water soluble silicates as prepared in Preparation Examples 2 to 22 and pigments as shown in Tables 2 (a) and 2 (b), and were applied on sandblasted steel plates, respectively. Then the properties of the formed coating films were tested, the results of which are shown in the following Tables 3 (a) and 3 (b).

COMPARATIVE EXAMPLES 1 – 4

In like manner as the procedure in the foregoing Example 1, coating materials were prepared using the materials as shown in the following Table 2 (b), and were applied on the similar steel plates. Then, the formed coating films were tested with regard to the similar properties, the results of which are shown in the following Table 3 (b).

Table 1 (a)

| Prep. Ex. No. | Aqueous Solution of Water Soluble Silicate Solid (%) | Aqueous Solution of Water Soluble Silicate Material | Amount (Parts) | Metals or Metallic Compounds Material | Amount (Parts) | Reaction Conditions Temp. (°C) | Reaction Conditions Time (Hours) |
|---|---|---|---|---|---|---|---|
| 2 | 40 | $Na_2O.3SiO_2$ | 100 | V | 1 | | |
| | | | | Al | 4 | 60 | 24 |
| | | | | $Al(OH)_3$ | 1 | | |
| 3 | 30 | $Li_2O.4SiO_2$ | 100 | $V(OH)_3$ | 0.8 | | |
| | | | | $Al_2O_3.3SiO_2$ | 1.2 | 60 | 24 |
| 4 | 30 | $K_2O.5SiO_2$ | 100 | $VO(H_2PO_2)_2$ | 0.8 | | |
| | | | | $Al(PO_4)$ | 0.8 | 100 | 8 |
| | | | | $Zn_3(PO_4)_2$ | 0.8 | | |
| 5 | 20 | $[N(CH_2OH)_4]_2O.7SiO_2$ | 100 | $VOSO_4$ | 1 | | |
| | | | | $Al_2Zn(SO_4)_4$ | 2 | 60 | 24 |
| 6 | 20 | $[N(CH_3)_3C_6H_5]_2O.5SiO_2$ | 100 | $V_2O_5$ | 0.5 | | |
| | | | | $ZnO.2B_2O_3$ | 1 | 60 | 24 |
| 7 | 40 | $Na_2O.3SiO_2$ | 100 | $VCl_3$ | 0.3 | | |
| | | | | $ZnCl_2$ | 0.3 | 80 | 20 |
| 8 | 40 | $Na_2O.3SiO_2$ | 100 | $V(OH)_3$ | 0.8 | | |
| | | | | $2ZnO.SiO_2$ | 1.2 | 100 | 9 |
| 9 | 40 | $Na_2O.3SiO_2$ | 100 | V | 0.5 | | |
| | | | | $Zn(OH)_2$ | 0.5 | 60 | 24 |
| | | | | Zn | 0.5 | | |
| 10 | 40 | $Na_2O.3SiO_2$ | 100 | $VCl_2$ | 0.05 | | |
| | | | | $AlCl_3$ | 0.05 | 30 | 48 |
| 11 | 40 | $Na_2O.3SiO_2$ | 100 | $V_2O_5$ | 2 | 60 | 24 |

Table 1 (b)

| Prep. Ex. No. | Aqueous Solution of Water Soluble Silicate Solid (%) | Aqueous Solution of Water Soluble Silicate Material | Amount (Parts) | Metals or Metallic Compounds Material | Amount (Parts) | Reaction Conditions Temp. (°C) | Reaction Conditions Time (Hours) |
|---|---|---|---|---|---|---|---|
| 12 | 40 | $Na_2O.3SiO_2$ | 100 | $V_2O_5$ | 0.5 | 100 | 8 |
| 13 | 30 | $Na_2O.4SiO_2$ | 100 | $V_2O_5$ | 6 | 30 | 100 |
| | | | | $V(OH)_3$ | 1 | | |
| 14 | 30 | $Li_2O.4SiO_2$ | 100 | $V_2O_5$ | 2 | 60 | 24 |
| 15 | 30 | $K_2O.5SiO_2$ | 100 | V | 0.1 | | |
| | | | | $V_2O_5$ | 0.1 | 60 | 24 |
| 16 | 20 | $[N(CH_2OH)_4]_2O.7SiO_2$ | 100 | $V_2O_5$ | 2 | 70 | 24 |
| 17 | 20 | $[N(CH_3)_3C_6H_5]_2O.5SiO_2$ | 100 | $VOSO_4$ | 1 | 100 | 9 |
| 18 | 40 | $Na_2O.3SiO_2$ | 100 | $VCl_2$ | 2 | 100 | 9 |
| 19 | 30 | $Li_2O.4SiO_2$ | 100 | $V_2(SO_4)_3$ | 4 | 100 | 9 |
| 20 | 30 | $K_2O.5SiO_2$ | 100 | $VCl_3$ | 1 | | |
| | | | | $VO(H_2PO_2)_2$ | 2 | 100 | 9 |
| 21 | 40 | $Na_2O.3SiO_2$ | 100 | V | 9 | 60 | 24 |
| 22 | 40 | $Na_2O.3SiO_2$ | 100 | $V_2O_5$ | 0.1 | — | — |

Table 2 (a)

| Example No. | Vehicle Prep. Ex. No. | Amount (Parts) | Anticorrosive Metallic Powder | Pigments Amount (Parts) | Other Pigment | Amount (Parts) |
|---|---|---|---|---|---|---|
| Example 2 | Prep. Ex. 2 | 100 | (Metallic zinc powder | 350 | — | — |
| | | | (Metallic aluminium powder (av. particle size: 5 μ) | 50 | | |
| Example 3 | Prep. Ex. 3 | 100 | Metallic zinc powder | 300 | Talc | 100 |
| Example 4 | Prep. Ex. 4 | 100 | Metallic zinc powder | 460 | — | — |
| Example 5 | Prep. Ex. 5 | 100 | Metallic zinc powder | 180 | — | — |
| Example 6 | Prep. Ex. 6 | 100 | Metallic zinc powder | 240 | Red iron oxide | 20 |
| Example 7 | Prep. Ex. 7 | 100 | Metallic aluminium | 330 | — | — |
| Example 8 | Prep. Ex. 8 | 100 | Metallic zinc powder | 300 | Baryta | 80 |
| Example 9 | Prep. Ex. 9 | 100 | Metallic zinc powder | 460 | — | — |
| Example 10 | Prep. Ex. 11 | 100 | Metallic zinc powder | 460 | — | — |
| Example 11 | Prep. Ex. 11 | 100 | (Metallic zinc powder | 380 | — | — |
| | | | (Metallic aluminium powder | 20 | | |
| Example 12 | Prep. Ex. 12 | 100 | Metallic zinc powder | 320 | Talc | 80 |
| Example 13 | Prep. Ex. 13 | 100 | Metallic zinc powder | 460 | — | — |
| Example 14 | Prep. Ex. 14 | 100 | Metallic zinc powder | 460 | Basic zinc chromate | 20 |
| Example 15 | Prep. Ex. 14 | 100 | Metallic zinc powder | 320 | Red iron oxide | 40 |

Table 2 (b)

| Example No. | Vehicle Prep. Ex. No. | Amount (Parts) | Anticorrosive Metallic Powder | Pigments Amount (Parts) | Other Pigment | Amount (Parts) |
|---|---|---|---|---|---|---|
| Example 16 | Prep. Ex. 15 | 100 | Metallic aluminium | 250 | — | — |

Table 2 (b)-continued

| Example No. | Vehicle Prep. Ex. No. | Amount (Parts) | Anticorrosive Metallic Powder | Amount (Parts) | Other Pigment | Amount (Parts) |
|---|---|---|---|---|---|---|
| Example 17 | Prep. Ex. 16 | 100 | Metallic zinc powder | 300 | Baryta | 80 |
| Example 18 | Prep. Ex. 17 | 100 | Metallic zinc powder | 230 | — | — |
| Example 19 | Prep. Ex. 18 | 100 | Metallic zinc powder | 460 | — | — |
| Example 20 | Prep. Ex. 19 | 100 | (Metallic zinc powder (Metallic aluminium powder | 380 20 | Red iron oxide | 40 |
| Example 21 | Prep. Ex. 20 | 100 | Metallic zinc powder | 210 | — | — |
| Example 22 | Prep. Ex. 21 | 100 | Metallic zinc powder | 460 | — | — |
| Comparative Example 1 | Prep. Ex. 10 | 100 | Metallic zinc powder | 460 | — | — |
| Comparative Example 2 | Prep. Ex. 22 30% aq. soln. | 100 | Metallic zinc powder | 460 | — | — |
| Comparative Example 3 | $Li_2O.4SiO_2$ | 100 | Metallic zinc powder | 460 | — | — |

Table 3 (a)

| Example Number | Storage Stability of Vehicle (6 months) | Pot Life (Hours) | Hard-Ness | Drying Property (Hours) Initial Drying Property | Drying in Humid Condition | Thick Coating Property ($\mu$) Critical Thickness to Cracking | Critical Thickness to Running | Water Resistance | Seawater Resistance Single Coating | After Application of Top Coating |
|---|---|---|---|---|---|---|---|---|---|---|
| 1 | Good | 20 | 3H | 3 | Good | 200 | 240 | Good | Good | Good |
| 2 | Good | 48 | F | 7 | Good | 500 | 500 | Good | Good | Good |
| 3 | Good | 48 | 2H | 4 | Good | 500 | 500 | Good | Good | Good |
| 4 | Good | 18 | 3H | 3 | Good | 300 | 350 | Good | Good | Good |
| 5 | Good | 24 | 4H | 3 | Good | 250 | 300 | Good | Good | Good |
| 6 | Good | 24 | 5H | 3 | Good | 300 | 350 | Good | Good | Good |
| 7 | Good | 48 or more | B | 24 | Good | 500 | 500 | Good | Good | Good |
| 8 | Good | 24 | 4H | 3 | Good | 250 | 250 | Good | Good | Good |
| 9 | Good | 24 | 4H | 3 | Good | 300 | 300 | Good | Good | Good |
| 10 | Good | 20 | 3H | 3 | Good | 200 | 240 | Good | Good | Good |
| 11 | Good | 48 | F | 7 | Good | 500 or more | 500 | Good | Good | Good |
| 12 | Good | 48 | 4H | 4 | Good | 500 | 500 | Good | Good | Good |
| 13 | Good | 18 | 3H | 3 | Good | 300 | 300 | Good | Good | Good |
| 14 | Good | 24 | 4H | 3 | Good | 250 | 300 | Good | Good | Good |
| 15 | Good | 24 | 6H | 3 | Good | 300 | 350 | Good | Good | Good |

Table 3 (b)

| Example Number | Storage Stability of Vehicle (6 months) | Pot Life (Hours) | Hard-ness | Drying Property (Hours) Initial Drying Property | Drying in Humid Condition | Thick Coating Property ($\mu$) Critical Thickness to Cracking | Critical Thickness to Running | Water Resistance | Seawater Resistance Single Coating | After Application of Top Coating |
|---|---|---|---|---|---|---|---|---|---|---|
| 16 | Good | 48 or more | B | 24 | Good | 500 | 500 | Good | Good | Good |
| 17 | Good | 18 | 3H | 3 | Good | 460 | 500 | Good | Good | Good |
| 18 | Good | 24 | 5H | 3 | Good | 300 | 400 | Good | Good | Good |
| 19 | Good | 18 | 3H | 3 | Good | 200 | 250 | Good | Good | Good |
| 20 | Good | 24 | 4H | 3 | Good | 500 or more | 500 | Good | Good | Good |
| 21 | Good | 18 | 4H | 3 | Good | 200 | 250 | Good | Good | Good |
| 22 | Good | 20 | 3H | 4 | Good | 200 | 250 | Good | Good | Good |
| Comp. Ex. 1 | Good | 6 | 3H | 8 | Good | 180 | 200 | Softened coating surface(3B) and rust gathering 80% | Softened coating surface(B) and rust gathering 50% | Blistering throughout |
| Comp. Ex. 2 | Good | 6 | 3H | 8 | Good | 150 | 200 | The same as the above | The same as the above | The same as the above |
| Comp. Ex. 3 | Good | 20 | 2H | 6 | Cracking Throughout | 220 | 100 | Softened coating surface(4B) and rust gathering 40% | Rust gathering 20% | Blistering partially |

The test methods which were practised with regard to the foregoing Tables 3 (a) and 3 (b) were as follows.

1. Storage Stability of Vehicle

This was carried out according to JIS (Japanese Industrial Standard) K 5400.9.2. The storage period was 6 months.

2. Pot Life

This was carried out according to JIS K 5633.4.8 (59).

3. Hardness

Horizontally held sandblasted steel plates (7 × 15 cm, 3.2 mm in thickness) were coated to form coating films of 75 microns in dried thickness, then the plates were dried for 2 days in a thermostat at 20°C and 75 percent in humidity. Thereafter, the tests were carried out according to JIS K 5400.6.14 (70).

4. Initial Drying Property

Horizontally held sandblasted steel plates (7 × 15 cm, 3.2 mm in thickness) were coated to form coating films of 75 microns in dried thickness, then the plates were immersed into city water for 2 hours. Thereafter, the plates were taken out and the times in which neither blistering nor softening being observed were measured.

5. Drying Property in Humid Condition

Test plates were prepared in like manner as those in the above (4), and just after the coating, the plates were held in a thermostat at 5°C and 98 percent or higher in humidity for 4 days. Then the test plates were dried in another thermostat at 20°C and 75 humidity for 24 hours, and the conditions of the surfaces of test plates were observed visually.

6. Critical Thickness to Cracking

Vertically held sandblasted steel plates (10 × 30 cm, 3.2 mm in thickness) were applied with continuous coating films of 0 to 500 microns in thickness, and were stood still in a thermostat at 20°C and 75 percent in humidity for 2 days. Thereafter, the maximum thickness in which no crack being formed was observed visually.

7. Critical Thickness to Running

In the procedure of the above (6), the maximum thickness in which no running of the coating film being caused was observed visually.

8. Water Resistance

The test plates which were prepared in like manner as the above (3) were immersed into city water for 7 days, then they were taken out and observed viaually, and further the softenings of the coating surfaces were sested in like manner as the above (3).

9. Seawater Resistance (Single Coating)

In the procedure of the above (8), seawater was used in place of the city water.

10. Seawater Resistance (After Application of Top Coating)

The test plates which were prepared in like manner as the above (3), were coated with epoxy coating material to form coating films of 100 microns in thickness. Said epoxy coating material was prepared by mixing aluminium anticorrosive pigment into a mixture of epoxy resin and polyamide hardener (vehicle:pigment = 1:2.2). Thus prepared test plates were dried in a thermostat at 20°C and 75 percent in humidity for 7 days, then they were further coated with cuprous oxide antifouling paint coating of 40 microns in thickness and dried for 2 days. Then thus obtained coated plates were rafted and immersed into seawater, and they were taken out after 6 months from the seawater to be observed visually.

What is claimed is:

1. An inorganic coating composition which forms a hard, water resistant, and corrosion resistant protective layer when directly applied to a substrate without subsequent post deposition acid or heat treatments comprising:

a. a vanadium-modified water soluble silicate aqueous solution comprising the reaction product of effective amounts of aqueous silicate solution and a member taken from the group of vanadium, vanadium compounds, and mixtures thereof, said reactants reacting at room temperature for about 4 days or more, at about 60°C for 24 hours or more, or at about 100°C for 8 hours or more, said reactants include about 100 parts by weight of an aqueous solution of water soluble silicates and from about 0.5 to about 25 parts by weight of said vanadium, vanadium compounds, or mixtures thereof; said vanadium compounds being selected from the group consisting of vanadium oxides, vanadium hydroxides, vanadium halides, vanadium sulphates, vanadium phosphates, vanadium silicates, vanadium borates, vanadium nitrates, and vanadium carbonates; and b. an anticorrosive metallic powder dispersed in said aqueous solution of said vanadium-modified water soluble silicate.

2. The coating composition of claim 1 wherein said water soluble silicate is represented by the general formula:

$$M_2O \cdot xSiO_2$$

where M is an alkali metal, $-N(CH_2OH)_4$, $-N(C_2H_4OH)_4$ or $-N(CH_3)_3C_6H_5$, and $x$ is a positive number from 2 to 9.0.

3. The coating composition as defined in claim 2 wherein said anticorrosive metallic powder is selected from the group consisting of zinc, aluminium, lead, or mixtures thereof, said powder having an average particle size ranging from 3 to 5 microns, and a particle size distribution ranging from 1 to 15 microns.

4. The coating composition as defined in claim 3 further including a member selected from the group consisting of zinc and aluminium compounds.

5. The coating composition as defined in claim 4 wherein said zinc and aluminium compounds include oxides, hydroxides, halides, sulphates, phosphates, silicates, nitrates and carbonates.

6. The coating composition as defined in claim 1 wherein said vanadium and vanadium compounds are present in an amount ranging from 1.0 to 20 parts by weight per 100 parts by weight of said water soluble silicate.

7. The coating composition as defined in claim 1 further including a pigment admixed therein.

8. A method for preparing an inorganic coating composition which forms a hard, water resistant, and corrosion resistant protective layer when directly applied to a substrate without subsequent post deposition acid or heat treatments comprising the steps of:

a. mixing 100 parts by weight of an aqueous solution of water soluble silicate with 0.5 to 25 parts by weight of vanadium or compounds thereof, said vanadium compounds being selected from the group consisting of vanadium oxide, vanadium hydroxide, vanadium halides, vanadium sulphates, vanadium phosphates, vanadium silicates, vanadium borates, vanadium nitrates and vanadium carbonates;

b. reacting said mixture from at least room temperature for 4 days or more to about 100°C for 8 hours or more to form an aqueous solution of vanadium-modified water soluble silicate as a reaction product; and c. dispersing anticorrosive metallic powder into said aqueous solution of vanadium-modified water silicate.

9. A method for coating a substrate including the steps of:

a. providing a coating composition as defined in claim 1;
b. applying said coating composition to the surface of an oxidizable substrate to be protected; and
c. drying said applied coating composition to form an adherent, anticorrosive protective layer.

10. A coated article made in accordance with the method recited in claim 9.

* * * * *